US011081139B2

(12) United States Patent
Oxholm et al.

(10) Patent No.: US 11,081,139 B2
(45) Date of Patent: Aug. 3, 2021

(54) VIDEO INPAINTING VIA CONFIDENCE-WEIGHTED MOTION ESTIMATION

(71) Applicant: Adobe Inc., San Jose, CA (US)

(72) Inventors: Geoffrey Oxholm, Albany, CA (US); Oliver Wang, Seattle, WA (US); Elya Shechtman, Seattle, WA (US); Michal Lukac, San Jose, CA (US); Ramiz Sheikh, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 96 days.

(21) Appl. No.: 16/378,906

(22) Filed: Apr. 9, 2019

(65) Prior Publication Data
US 2020/0118254 A1    Apr. 16, 2020

Related U.S. Application Data

(60) Provisional application No. 62/745,260, filed on Oct. 12, 2018.

(51) Int. Cl.
*G11B 27/036* (2006.01)
*H04N 9/873* (2006.01)
(Continued)

(52) U.S. Cl.
CPC ............ *G11B 27/036* (2013.01); *G06T 5/005* (2013.01); *G06T 7/11* (2017.01); *G06T 7/215* (2017.01);
(Continued)

(58) Field of Classification Search
CPC ......... G06T 7/11; G06T 5/005; G06T 11/001; G06T 11/60; G06T 2207/10016;
(Continued)

(56) References Cited

U.S. PATENT DOCUMENTS 6,667,774 B2 * 12/2003 Berman ................. H04N 5/272
348/584
9,741,144 B2    8/2017 Paris et al.
(Continued)

FOREIGN PATENT DOCUMENTS

EP    2608148    6/2013

OTHER PUBLICATIONS

Ng, King-To, Shing-Chow Chan, and Heung-Yeung Shum. "Data compression and transmission aspects of panoramic videos." IEEE Transactions on Circuits and Systems for Video Technology 15.1 (2005): 82-95. (Year: 2005).*
(Continued)

*Primary Examiner* — Pinalben Patel
(74) *Attorney, Agent, or Firm* — Kilpatrick Townsend & Stockton LLP (57) ABSTRACT

Certain aspects involve video inpainting via confidence-weighted motion estimation. For instance, a video editor accesses video content having a target region to be modified in one or more video frames. The video editor computes a motion for a boundary of the target region. The video editor interpolates, from the boundary motion, a target motion of a target pixel within the target region. In the interpolation, confidence values assigned to boundary pixels control how the motion of these pixels contributes to the interpolated target motion. A confidence value is computed based on a difference between forward and reverse motion with respect to a particular boundary pixel, a texture in a region that includes the particular boundary pixel, or a combination thereof. The video editor modifies the target region in the video by updating color data of the target pixel to correspond to the target motion interpolated from the boundary motion.

20 Claims, 6 Drawing Sheets
(1 of 6 Drawing Sheet(s) Filed in Color)

(51) Int. Cl.
*H04N 5/272* (2006.01)
*G06T 7/215* (2017.01)
*G06T 7/11* (2017.01)
*G06T 5/00* (2006.01)
*G06T 11/00* (2006.01)
*G06T 11/60* (2006.01)

(52) U.S. Cl.
CPC ............ *G06T 11/001* (2013.01); *G06T 11/60* (2013.01); *H04N 5/272* (2013.01); *H04N 9/873* (2013.01)

(58) Field of Classification Search
CPC ....... G06T 7/215; G06T 7/269; G11B 27/036; H04N 9/873; H04N 5/272; H04N 5/265
See application file for complete search history.

(56) References Cited

U.S. PATENT DOCUMENTS

| | | | |
|---|---|---|---|
| 9,892,537 | B2 | 2/2018 | Paris et al. |
| 1,004,943 | A1 | 8/2018 | Paris et al. |
| 1,053,452 | A1 | 1/2020 | Suchland |
| 2006/0257042 | A1 | 11/2006 | Ofek et al. |
| 2008/0112642 | A1 | 5/2008 | Matsushita |
| 2016/0111129 | A1 | 4/2016 | Crivelli |
| 2017/0228875 | A1* | 8/2017 | Nash .................. G06T 7/11 |
| 2020/0143541 | A1* | 5/2020 | Wang .................. G06T 7/73 |

OTHER PUBLICATIONS

Xu, Rui, et al., "Deep Flow-Guided Video Inpainting," https://nbei.github.io/video-inpainting.html, ,2019 4 pages.

Zhang, Richard, et al., "Colorful Image Colorization," arXiv: 08511v5, Oct. 5, 2016, 29 pages.

Yu, Jiahui, et al., "Generative Image Inpainting with Contextual Attention," arXiv:1801.07892v2, Mar. 21, 2018, 15 pages.

Yu, Jiahui, et al., "Free-Form Image Inpainting with Gated Convulution," arXiv:1806.03589v2, Oct. 22, 2019, 17 pages.

Xu, Rui, et al., "Deep Flow-Guided Video Inpainting," Conference on Computer Vision and Pattern , IEEE, May 2019, 10 pages.

Search and Examination Report from related Great Britain Application GB1911506.2, dated Feb. 19, 2020, 7 pages.

Huang, Jia-Bin, et al., "Temporally Coherent Completion of Dynamic Video", ACM Transactions on Graphics, vol. 35, Issue 6, Article No. 196, Nov. 2016, 11 pages.

Wexler, Yonatan., et al., "Space-Time Video Completion", IEEE Transactions on Pattern Analysis and Machine Intelligence, vol. 29, Issue 3, Mar. 2007, 8 pages.

Adobe, "Project Cloak: Content-Aware Fill for Video", https://www.youtube.com/watch?v=Po-TLPnlrIU, Nov. 10, 2017, accessed Apr. 9, 2019, 3 pages.

Kunz, Meredith Alexander, Adobe Research, "Cloak: Remove Unwanted Objects in Video", https://research.adobe.com/news/cloak-remove-unwanted-objects-in-video, Dec. 11, 2017, accessed Apr. 9, 2019.

Adobe Blog, Adobe Communication Team "Peek Behind the Sneaks: #Project Cloak—Filmmakers Gain the Power of Invisibility", https://theblog.adobe.com/peek-behind-sneaks-filmmakers-gain-power-invisibility/, Jan. 10, 2018, accessed on Apr. 9, 2019, 4 pages.

Mocha Pro, Mocha Pro: Object Removal & Clean Plating, https://www.youtube.com/watch?v=_OUxcFHGOb8, Feb. 13, 2018, accessed Apr. 9, 2019.

U.S. Appl. No. 16/585,433 , Final Office Action, dated Jul. 24, 2020, 13 pages.

U.S. Appl. No. 16/585,433 , First Action Interview Office Action Summary, dated Jul. 28, 2020, 12 pages.

U.S. Appl. No. 16/585,433 , First Action Interview Pilot Program Pre-Interview Communication, dated Apr. 29, 2020, 4 pages.

U.S. Appl. No. 16/585,433 , Notice of Allowance, dated Aug. 25, 2020, 5 pages.

Gao, Chen, et al., "Flow-edge Guided Video Completion", http://chengao.vision/FGVC/files/FGVC.pdf, European Conference on Computer Vision, 2020, 17 pages.

* cited by examiner

VIDEO INPAINTING VIA CONFIDENCE-WEIGHTED MOTION ESTIMATION

CROSS REFERENCE TO RELATED APPLICATIONS

This disclosure claims priority to U.S. Provisional Application No. 62/745,260, filed on Oct. 12, 2018, which is hereby incorporated in its entirety by this reference.

TECHNICAL FIELD

This disclosure relates generally to automated processing of video content for video playback systems. More specifically, but not by way of limitation, this disclosure relates to using confidence-weighted estimates of pixel motion within a target region of a set of video frames to perform video inpainting with respect to the target region.

BACKGROUND

Certain video editing programs include features for replacing content in a target region with other desired content, such as user-provided content or content that is copied or derived from other regions in the video. As one example, video inpainting methods are used to fill user-specified, spatiotemporal holes in a video with content using remaining parts of the video. Video inpainting is used for different applications, such as, but not limited to, unwanted object removal, video stabilization, logo or watermark removal in broadcast videos, and restoration of damaged film content, etc.

One example of video inpainting involves manually editing each video frame. For instance, a video editor is used to manually copy content from a "clean" version of a scene that lacks the object to be removed and edit a version of the scene with the object to replace the object with content from the "clean" scene. However, this technique relies on the availability of a "clean" version of a scene. If a "clean" version of a scene is unavailable, each frame must be edited manually using, for example, an image editing tool such as Adobe® Photoshop®. Manual edits of multiple video frames can be tedious and may lack uniformity, such as when a manual edit to a first frame and a separate manual edit to another frame differ based on errors by the user, subjective judgments by the user, etc.

Another example of a video inpainting technique is plane tracking. A software tool that uses plane tracking will track a rectangle of source content and an area of content to be removed or modified. The software will place the source content over the object to be removed or modified. However, plane tracking requires that the background content (e.g., content behind a hole to be filled or object to be replaced) be planar. In the absence of such planar content, the resulting edited video may include artifacts of the removed object or otherwise lack the desired quality.

Therefore, existing solutions may involve disadvantages for reasons such as (but not limited to) those described above.

SUMMARY

Certain aspects involve using confidence-weighted estimates of pixel motion within a target region of a set of video frames to perform inpainting with respect to the target region across the video frames. For instance, a video editor accesses video content having an annotation that identifies a target region to be modified in one or more video frames of a depicted scene. The video editor computes a motion for a boundary of the target region. The video editor also assigns confidence values to boundary pixels. A particular confidence value is computed based on a difference between forward and reverse motion with respect to a particular boundary pixel, a texture in a region that includes the particular boundary pixel, or a combination thereof. The video editor interpolates, from the boundary motion, a target motion of a target pixel within the target region. In the interpolation, the assigned confidence values control the contributions, to the interpolated target motion, of different motions for different boundary pixels. The video editor modifies the target region in the video by updating color data of the target pixel to correspond to the target motion interpolated from the boundary motion.

BRIEF DESCRIPTION OF THE DRAWINGS

Features, aspects, and advantages of the present disclosure are better understood when the following Detailed Description is read with reference to the accompanying drawings. The patent or application file contains at least one drawing executed in color. Copies of this patent or patent application publication with color drawing(s) will be provided by the Office upon request and payment of the necessary fee.

DETAILED DESCRIPTION

Certain aspects involve using confidence-weighted estimates of pixel motion along a boundary of a target region in a set of video frames to perform video inpainting with respect to the target region. For instance, a video editor assists with modifying a target region of a video, which includes portions of video frames depicting an object to be removed or modified, by using the computed motion of a scene depicted in the video to identify content to be copied into the target region. Such a computation of scene motion includes estimating, prior to modifying the target region, what the motion of the scene would be within the target region based on the motion of other pixels in the scene, such as the motion of boundary pixels defining a boundary of the target region. The video editor, by implementing certain aspects described herein, improves the accuracy of this motion estimate by assigning confidence values to certain pixels, where a confidence value indicates a reliability of a motion computation with respect to these pixels. In a motion-estimation operation performed by the video editors, pixels with a more reliable motion computation have a larger impact in estimating motion within the target region, and vice versa.

The following non-limiting example is provided to introduce certain aspects. In this example, a video editor accesses a set of video frames, such as an input video being modified by a user with the video editor, that depict a scene. For instance, a depicted scene includes a football game in progress as well as a spectator that disrupts the view of the football game by walking in front of the camera. The set of video frames includes (or is otherwise associated with) an annotation identifying a target region to be modified in one or more video frames comprising the scene. For instance, the video editor could receive user inputs that identify the spectator object in one or more video frames. The video editor could use these inputs to annotate the spectator object in the set of video frames that comprise the scene.

Continuing with this example, the video editor computes a boundary motion for a boundary of the target region within the scene. For instance, the boundary includes boundary pixels neighboring the target region (e.g., the "spectator" object) in a set of video frames. The boundary motion indicates how video content along the boundary moves within the scene as the video frames progress. If the scene depicts the football game behind the spectator, the various objects that comprise the football game (e.g., the field, the players, etc.) could move within the scene due to the movement of the objects themselves when captured (e.g., a player running down the field), the movement of the camera (e.g., due to the camera panning from one end of the field to the other), changing the zoom on the camera, or some combination thereof. The video editor also assigns confidence values to various boundary pixels. A particular confidence value could indicate whether a motion computed for a particular boundary pixel is sufficiently reliable to estimate motion within a target region. The video editor can compute the confidence based on, for example, a difference between forward and reverse motion with respect to a particular boundary pixel, a texture in a region that includes the particular boundary pixel, or both.

To remove the "spectator" object in this example, the video editor estimates the motion within the target region. Estimating the motion includes interpolating, from the boundary motion computed for the boundary pixels, target motion within the target region. Thus, the estimated motion within the target region is a function of the combined computations of motion for boundary pixels. A particular confidence value of a particular boundary pixel controls a contribution of that boundary pixel's motion to the interpolated target motion. For instance, if a boundary pixel's computed motion is unreliable, then a confidence value associated with that boundary pixel will decrease the impact of that boundary pixel's computed motion within the function of the combined computations of motion for boundary pixels.

The video editor uses the interpolated motion to update color data of target pixels within the target region. As a simplified example, if a particular "football player" object moves through the scene and is visible before and after the "spectator" object disrupts the scene, then the motion of a particular "football player" object follows a path between a first frame where the "football player" object is visible to a second frame where the "football player" object is occluded by the "spectator" object, where the first frame could occur before or after the second frame. The interpolated motion within the target region allows the video editor to estimate where the "football player" object would be within the target region, i.e., trace the pixels depicting the football player from the first frame to their expected position in the second frame. The video editor can therefore copy color data of the pixels depicting the football player from the first frame and update pixels of the target region in the second frame to include the copied color data. In this manner, the "football player" object replaces the disruptive "spectator" object in the video.

Confidence values used to estimate motion within a target region can be computed in any suitable manner. In some aspects, the video editor computes confidence values, at least in part, by determining whether the motion of certain scene pixels is self-consistent. For instance, the computed motion of a boundary from timestamp $t_1$ to $t_n$ (i.e., forward in time) should have the same magnitude and opposite direction as the computed motion of the boundary from timestamp $t_n$ to $t_1$ (i.e., back in time). Pairs of temporally adjacent frames should therefore exhibit consistency with respect to the forward and reverse motion. The video editor can increase or decrease the confidence of motion data from a boundary region based on how consistent the motion forward in time is with respect to the motion backward in time. In additional or alternative aspects, the video editor computes confidence values, at least in part, by evaluating the texture of video content around the target region. Low-texture areas may have motion data that is less reliable than high-texture areas. For instance, if a scene involved a camera panning across a clear blue sky, the computed motion for the "sky" portions of the scene may indicate very little motion (i.e., due to the absence in color variation from frame to frame) even though the panning camera did result in a moving scene. The video editor can therefore increase or decrease the confidence of motion data from a region based on how much texture (e.g., variation in grayscale intensity) is present in the region.

Certain aspects provide improvements to computing systems used for editing video content. For instance, as noted above, existing video inpainting techniques often entail manual, time-consuming processes to remove or modify target objects, and existing automated processes that are less cumbersome can introduce artifacts or other inaccuracies when replacing or otherwise modifying objects in a scene. These problems can be addressed by various features described herein. For instance, using confidence values to decrease or increase the impact of certain pixels on a motion-interpolation operation can increase the accuracy of the interpolated motion and, by extension, the quality of the inpainting operation by creating a modified video with few or no artifacts. In various examples, certain confidence-based inpainting techniques described herein do not rely on linear motion (i.e., motion constrained to a plane) or the identification of planes via user input. Thus, certain aspects described herein can automate video editing processes with a greater degree of accuracy than existing techniques.

Figure 1:
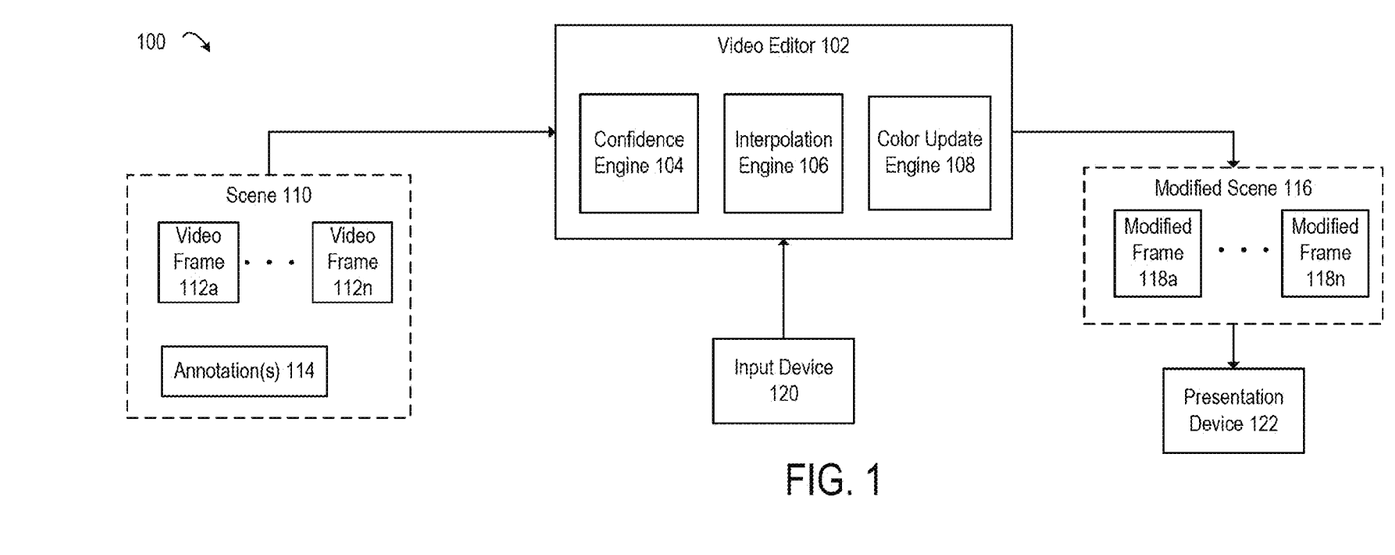
FIG. 1 depicts an example of a video processing environment for video inpainting via confidence-weighted motion estimation, according to certain aspects of this disclosure.

Example of an Operating Environment for Video Inpainting Via Confidence-Weighted Motion Estimation Referring now to the drawings, FIG. 1 depicts an example of a video editing environment 100 for motion-based video inpainting. The video editing environment 100 includes a set of communicatively coupled components. These components include a video editor 102 that can be executed on one or more computing devices, an input device 120 that can be used to provide commands to the video editor 102, and a presentation device 122 that displays video content to a user.

The video editor 102 includes program code for displaying and editing video content. Examples of this program code include program code for rendering content for display, program code for creating one or more instances of event listeners or other suitable objects for receiving input from input devices (e.g., a mouse, a touchscreen, etc.), program code for modifying color information for pixels in one or more frames of video content, etc.

In the example depicted in FIG. 1, the video editor includes a confidence engine 104, an interpolation engine 106, and a color update engine 108. The confidence engine 104 includes program code that, when executed by processing hardware, performs one or more operations for computing one or more measures of confidence in motion estimations performed by the video editor 102. The interpolation engine 106 includes program code that, when executed by processing hardware, performs one or more operations for estimating the motion of pixels bordering a user-specified area of interest across a set of video frames. The interpolation engine 106 includes program code that, when executed by processing hardware, performs one or more operations for estimating the motion of pixels within the user-specified area of interest across a set of video frames 112a-n. The color update engine 108 includes program code that, when executed by processing hardware, performs one or more operations for modifying color information within the user-specified area of interest based on the estimated motion.

While FIG. 1 depicts a video editor 102 that includes a confidence engine 104, an interpolation engine 106, and a color update engine 108, other implementations are possible. For instance, in various aspects, one or more of these engines can be omitted, the functionality of two or more of these engines can be combined into a single software engine, or one or more of these engines is included in software that is separate from and in communication with the video editor 102.

The video editor 102 is used to remove or modify one or more objects or other features in video content using confidence-weighted motion information. (An example of the object modification is discussed below with respect to FIG. 2, an example of using motion information is discussed below with respect to FIGS. 3-5, and an example of using confidence-weighted motion is discussed below with respect to FIG. 6.) Video content could include, for example, a sequence of video frames 112a through 112n. The sequence of video frames can collectively comprise a scene 110. Examples of removing or modify objects or other features include removing people or large objects (for color grading, or producing three-dimensional films), removing dark areas in the video resulting from dust on a lens of a camera, removing unwanted objects (trash, accidental set element), removing logos (for stock video or commercialization), removing distractors (labels, reflecting lights, etc.), changing appearance of something in a video by modifying only one frame or a small set of frames, etc.

In an illustrative example, the video editor 102 fills a target region, such as a hole region, in a set of video frames. A hole region can be a contiguous collection of pixels in the image that are transparent or semi-transparent. In this example, the video editor 102 receives, from the input device 120, one or more user inputs that specify an area of interest in one or more of the video frames 112a-112n. One or more annotations 114 are data that is included in or associated with video content to identify the area of interest in the set of video frames 112a-112n. In one example, the user inputs include drawing a rough mask or rotoscoping on one or more frames, where the one or more objects indicated by the mask are tracked over a sequence of frames (i.e., over time). The video editor 102 applies, responsive to one or more command inputs received via the input device 120, a motion-based video inpainting process to generate or otherwise identify target pixel data (e.g., color information). The target pixel data is used to modify the user-specified area of interest. In particular, the video editor 102 modifies color information of pixels in the area of interest to include the target pixel data. In this manner, the video editor 102 generates a modified scene 116 having one or more modified frames 118a-118n for display on the presentation device 122.

Figure 2:
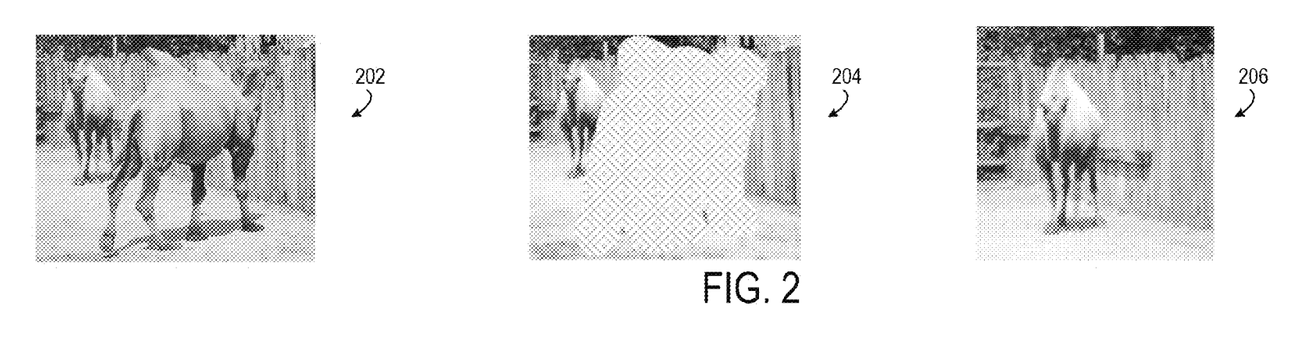
FIG. 2 depicts an example of modifying a video frame to be removed by the video processing environment of FIG. 1 using video inpainting, according to certain aspects of this disclosure.

FIG. 2 depicts an example of using the video editing environment 100 to remove an object from a scene. In this example, the video editor 102 identifies, based on one or more inputs from the input device 120, an object to be removed from the scene. For instance, the video editor 102 or other suitable software could receive a drawing input that selects one or more portions of a camel depicted in the frame 202 from a video. The video editor 102 or other suitable software annotates the frame 202 to specify that the camel identified via the user input should be removed, as indicated by the camel-shaped hole region in the annotated frame 204. The annotation can be a mask or other data that segments a target object from other objects in a frame. In some aspects, the video editor can propagate the identification of an object in one frame of a scene 110 to other frames of the scene 110 (e.g., other frames where the camel to be removed is depicted).

In some aspects, the color update engine 108 performs a pixel-replacement operation or other color-modification operation with respect to the hole region indicated in the annotated frame 204. For instance, the color update engine 108 can identify one or more replacement objects in the scene that are depicted in one or more frames prior to the frame 202, depicted in one or more frames subsequent to the frame 202, or both. In this example, the color update engine 108 identifies pixels included in the fence object that is depicted in the scene, where frames before or after the frame 202 depict the fence without the removed camel standing in front of the fence. The interpolated motion computed with the interpolation engine 106 allows the color update engine 108 to modify the pixel color information in the hole region while maintaining a consistent appearance of the replacement objects between frames.

The color update engine 108 modifies pixels within the hole region to have the color information from the identified pixels included in the fence object. By doing so, the color update engine 108 generates a modified frame 206, where the removed camel no longer appears and the hole region 204 has been modified to depict other scene objects occluded by the camel in frame 202 (e.g., a portion of the fence, a portion of the ground, etc.). This approach is known as "dense tracking." In some aspects, if one or more objects behind the removed object are not depicted in other frames of the scene, the video editor 102 can use a content-aware fill algorithm to guess what is missing.

As noted above, the motion-based video inpainting process involves using the apparent motion of color information from one pixel to another across the set of video frames 112a-112n to control how the area of interest is modified.

For instance, the video editor 102 uses confidence-weighted determinations of the motion of pixels on the boundary of an area of interest to control which target pixel data is identified or generated for updating the area of interest.

Example of Motion-Based Inpainting of a Target Region of a Video

Figure 3:
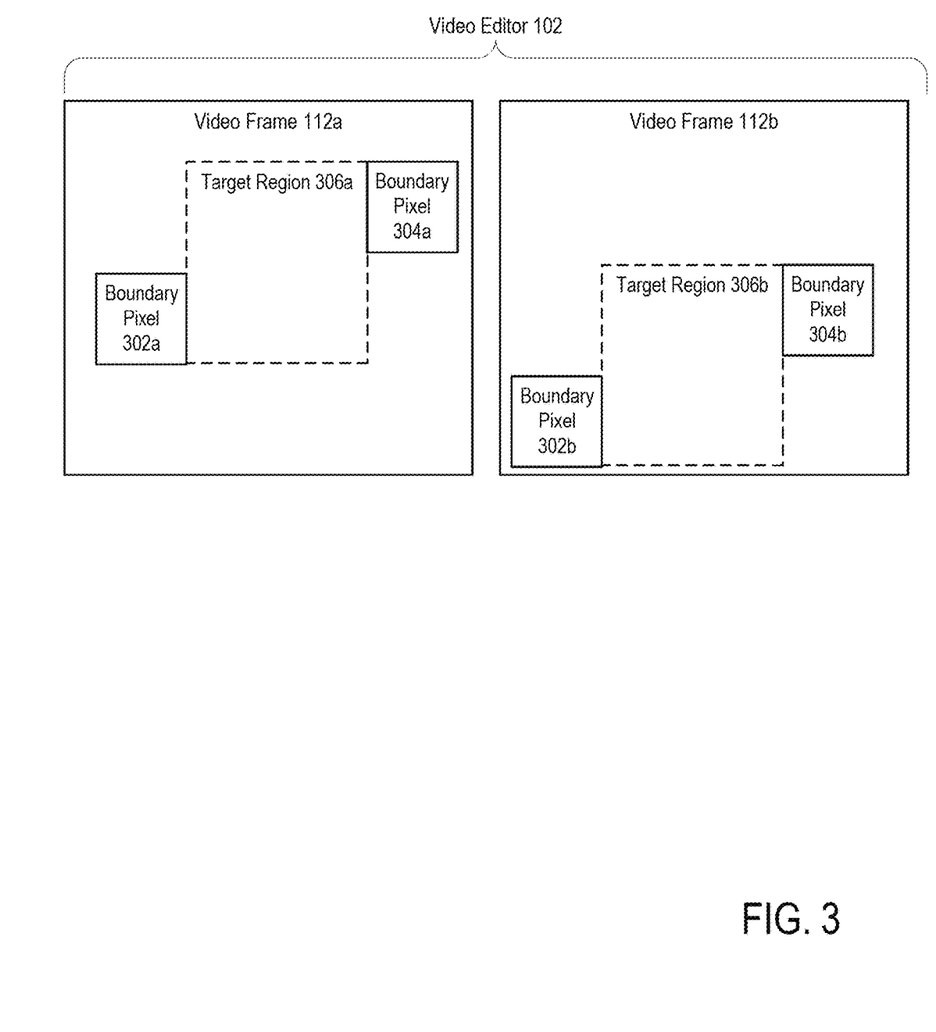
FIG. 3 depicts an example of video frames having a target region and associated boundary pixels that can be edited with the video processing environment depicted in FIG. 1, according to certain aspects of this disclosure.
Figure 4:
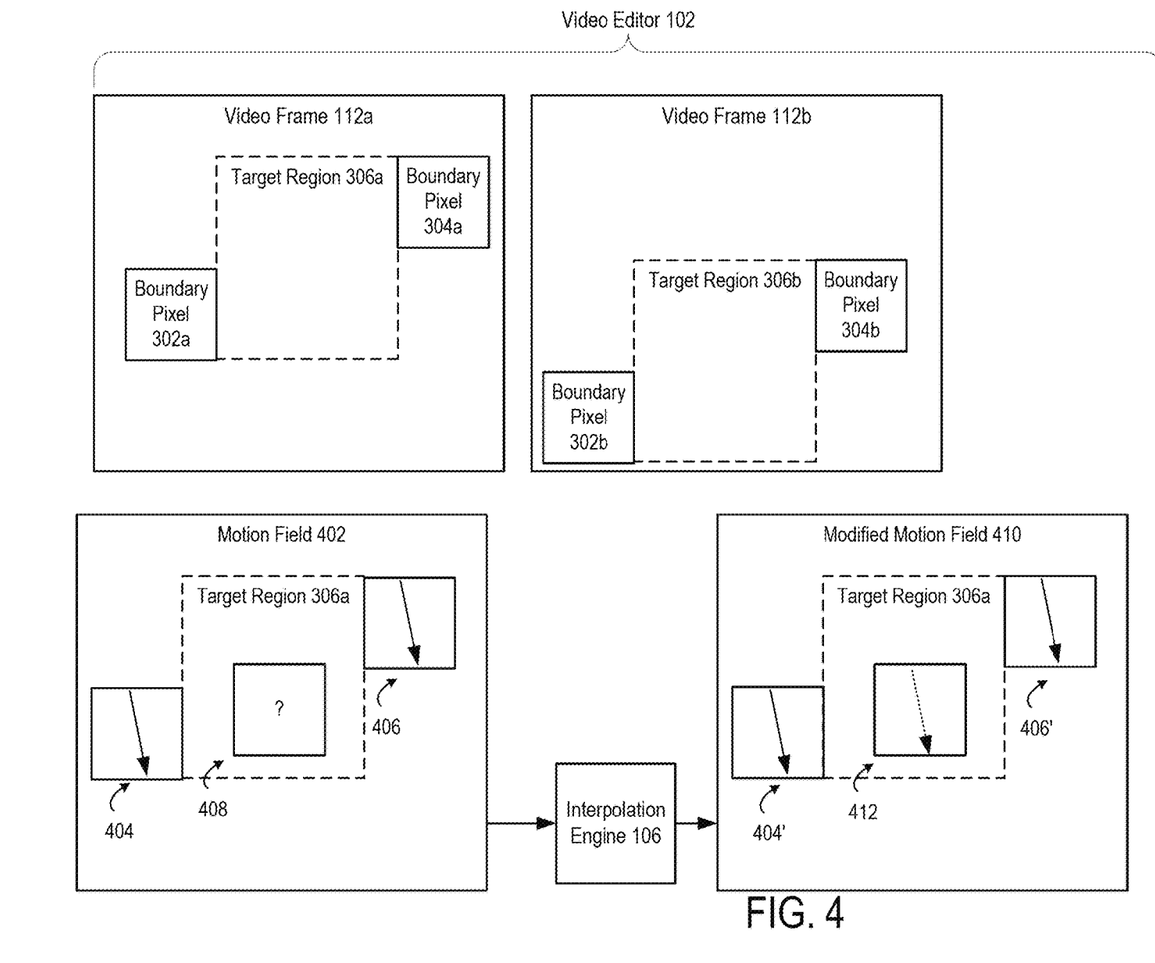
FIG. 4 depicts an example of motion fields that are computed from the video frames in FIG. 3, according to certain aspects of this disclosure.
Figure 5:
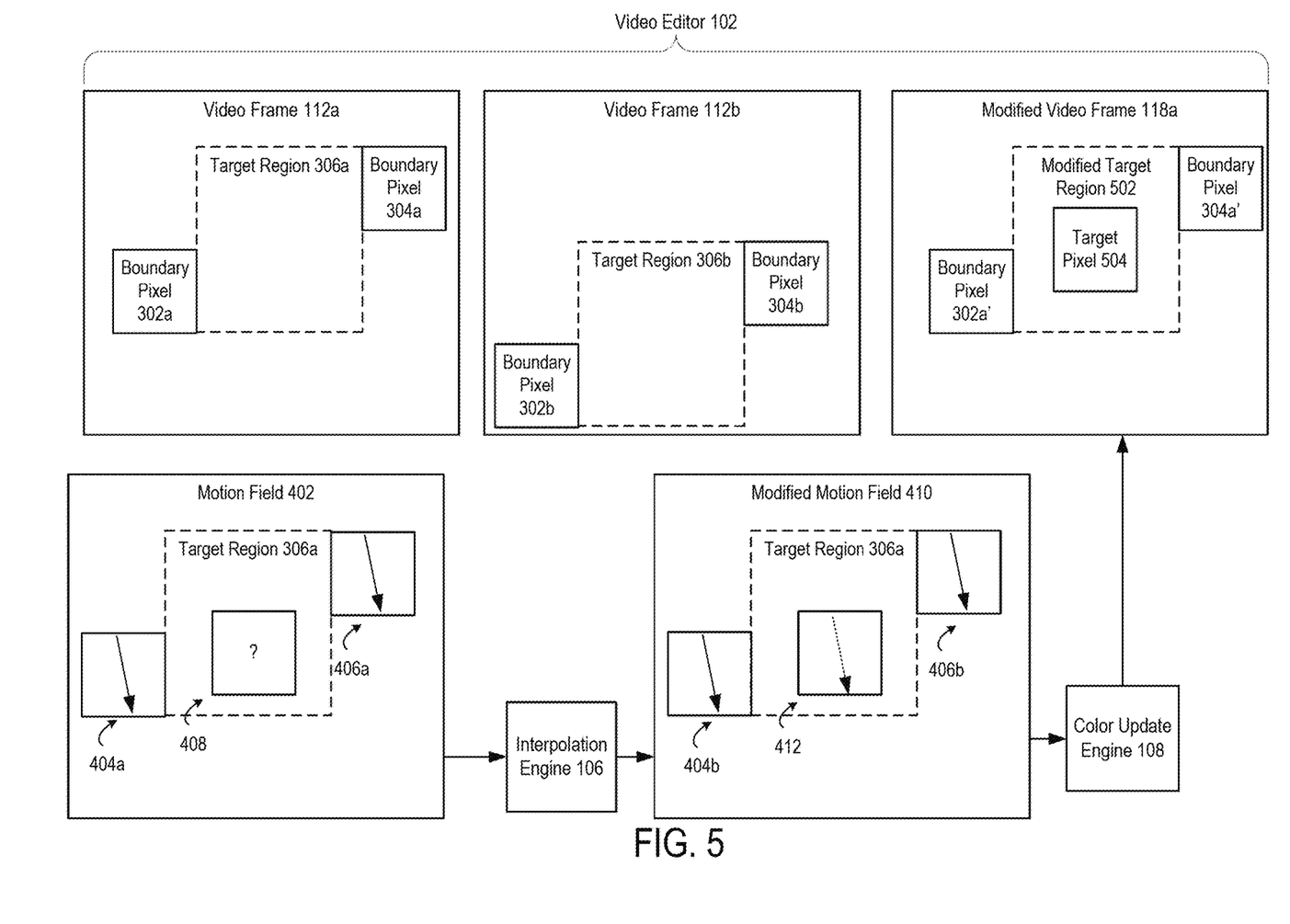
FIG. 5 depicts an example of interpolating motion from the motion fields of FIG. 4 and thereby updating a pixel of a target region in a video frame from FIG. 3, according to certain aspects of this disclosure.

FIGS. 3-5 depict a simplified example of a video editor 102 being used to perform motion-based modification of a target region. In this example, the video editor 102 performs fast and robust motion estimation. The video editor 102 can estimate motion within a target region using the motion at the boundary of the target region (e.g., a user-specified hole). To do so, the video editor 102 can compute optical-flow motion for an entire frame. The video editor 102 can focus on the motion of the pixels along the boundary of the hole in each frame. This motion-based modification can be used in the example of FIG. 2 to remove the target camel by keeping track of the movement of a building or other structures depicted behind the camel in a scene, which facilitates updating the hole region with color information from suitable pixels (i.e., pixels depicting the building or other structures).

In the simplified example of FIGS. 3-5, a video editor 102 accesses a pair of video frames 112a and 112b, as depicted in FIG. 3. The video content that includes the video frames 112a and 112b is annotated to identify a target region. For instance, the target region 306a in the video frame 112a could indicate that a particular object (e.g., the camel of FIG. 2) is to be removed, and the target region 306b in the video frame 112a could indicate that the same object at a different location within the scene is to be removed. The target region is bounded by a set of boundary pixels.

In FIG. 3, the boundary includes the boundary pixels 302a and 304a on opposite sides of the target region 306a in video frame 112a. In one example, the boundary pixel 302a could be part of a tree depicted in the frames of FIG. 2, the target region 306a could be the target camel depicted in the frames of FIG. 2, and the boundary pixel 304a could be part of a fence depicted in the frames of FIG. 2. Similarly, in the video frame 112b, the boundary includes the boundary pixels 302b and 304b (e.g., pixels from the tree and the fence in FIG. 2 at different locations) on opposite sides of the target region 306b (e.g., the target camel in FIG. 2 at a different location).

FIG. 4 depicts a simplified example of interpolating motion within a target region based on boundary pixels. In this example, the video editor 102 computes a motion field 402 for the video frame 112a based on an analysis of the pair of video frames 112a and 112b. The motion of boundary pixel 302a is represented as a vector 404, which is graphically illustrated in FIG. 4 using an arrow in the direction of movement specified by the vector 404. Similarly, the motion of boundary pixel 304a is represented as a vector 406, which is graphically illustrated in FIG. 4 using an arrow in the direction of movement specified by the vector 406. Because the target region 306a corresponds to an object to be removed from the frames, the motion field 402 is depicted as including an "unknown" motion for a target pixel within the target region 306a. In this example, the "unknown" motion is an unknown desired motion, i.e., the motion that would have been computed in the target region if the video frames 112a and 112b had been captured without the target object to be removed.

The interpolation engine 106 computes, based on the boundary motion, an estimated motion with respect the target region 306a. For instance, each boundary pixel is associated with a respective boundary motion represented by a vector, such as the vectors 404 and 406. The interpolation engine 106 uses the collection of vectors (including vectors 404 and 406) to compute an estimated motion for a target pixel within the target region 306a. The video editor 102 can also compute or obtain confidence values for motion values around the boundary of the target region. In some aspects, the video editor 102 can compute or obtain confidence values for motion values within the target region. The video editor 102 can use confidence values for motion around and/or within the target region to interpolate the motion within the target region. Examples of using confidence values to interpolate motion are described herein with respect to FIG. 6. The interpolation engine 106 generates a modified motion field 410 that includes a motion vector 412 for the estimated motion, along with the vectors 404' and 406', where the vectors 404' and 406' are the same as the vectors 404 and 406 for the boundary pixels 302a and 304a as in the motion field 402.

With the resulting estimated motion, the video editor 102 can trace, through time, paths of pixels (or, more specifically, objects comprised by the pixels) between locations outside the target region to locations inside the target region. Doing so allows the video editor 102 to identify or determine the appearance of these pixels using video frames in which the pixels are not in the target region. FIG. 5 depicts a simplified example of modifying color information of a target pixel within a target region based on an estimated motion computed by the interpolation engine 106. In this example, the color update engine 108 has used the motion vector 412 to add a target pixel 504 to a modified target region 502. To do so, the color update engine "traces" a pixel from a location outside the target region to a location within the target region.

Using the example of FIG. 2, a "traced" pixel could be a portion of a tree object that is occluded by the target camel object in the video frames 112a and 112b, but that is visible in one or more reference frames. A reference frame could be sequenced before one or more of the video frames 112a and 112b, sequenced after one or more of the video frames 112a and 112b, or both. In a simplified example, a pixel located at position (3,1) in a reference frame could have a brown color, i.e., be a part of the brown fence object. The motion vector 412 indicates the motion through the target region that would have been associated with the "fence" pixel if the fence object had not been occluded by target "camel" object in the frames 112a and 112b. For instance, the motion vector 412 for this "fence" pixel could indicate a motion of two pixels down and three pixels right. The color update engine 108 can therefore determine that, in the absence of the occlusion by the "camel" object, the "fence" pixel would have been located in the target region of the video frame 112a at position (1, 4) (i.e., two pixels down and three pixels right from the (3,1) location). The color update engine 108 therefore copies color information from the pixel located at position (3,1) in the reference frame (i.e., the "fence" pixel) to the target pixel 504 located at position (1,4) in the modified video frame 118a.

If a pixel does not have any observations outside of the hole, the video editor 102 can use content-aware fill for a single frame, and then propagate those color values through time. Sometimes multiple frames will be needed. In some embodiments, the frame with the largest "unseen region" will be chosen first. The unseen region is filled with content-aware-fill and propagated through time. If any unseen regions still exist, the largest region may again be chosen. This is repeated until all hole pixels have been filled.

Figure 6:
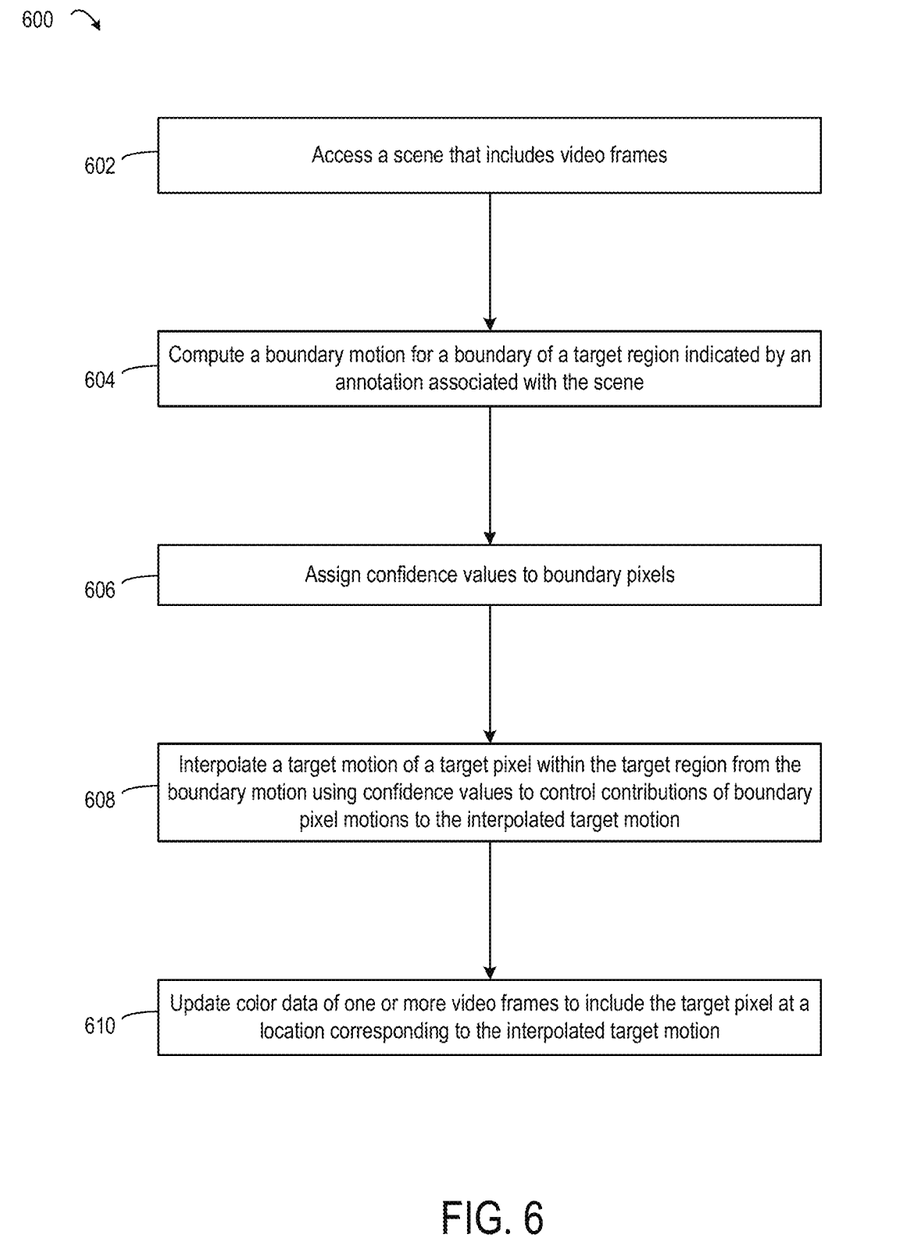
FIG. 6 depicts an example of a process for using confidence-weighted estimates of pixel motion within a target region of a set of video frames to perform inpainting with respect to the target region across the video frames, according to certain aspects of this disclosure.

In the example depicted in FIGS. 3-5, the video editor 102 can use one or more confidence measures to control the interpolation of motion, as described herein with respect to FIG. 6. In some aspects, the video editor 102 determines whether motion at the boundary of the target region is self-consistent. This determination involves comparing the boundary motion forward in time (e.g., from video frame 112a to 112b) to the boundary motion backward in time (e.g., from video frame 112b to 112a). If the forward motion and backward motion have the same magnitude in opposite directions (e.g., a forward motion of four pixels up and a reverse motion of four pixels down), the motion is consistent. Smaller differences in the forward motion and backward motion can indicate a higher degree of consistency, and vice versa. In a simplified example, the video editor 102 can disregard motion data for a particular section of the boundary if the motion is insufficiently consistent. Additionally or alternatively, the video editor 102 can improve interpolation of the motion by checking if the content around the target region contains sufficient texture. Low texture areas (like sky) lead to misleading motions and the video editor 102 can improve interpolation by disregarding them. Additionally or alternatively, the video editor 102 can use structure from motion ("SfM") to track 3D points with known motion as they pass through the hole. Motion from 3D objects within the hole are ignored, and background objects are used.

Example of a Process for Video Inpainting via Confidence-Weighted Motion Estimation FIG. 6 depicts an example of a process 600 for performing motion-based video inpainting. One or more operations described with respect to FIGS. 1-6 can be used to implement a step for updating video content in a target region based on confidence-weighted motion estimation for the target region. In some aspects, one or more computing devices implement operations depicted in FIG. 6 by executing suitable program code (e.g., the video editor 102, one or more of the engines depicted in FIG. 1, etc.). For illustrative purposes, the process 600 is described with reference to certain examples depicted in the figures. Other implementations, however, are possible.

At block 602, the process 600 involves accessing a scene that includes video frames. For instance, the video editor 102 can access video content from a data storage unit. The data storage unit can be located on one or more memory devices available over a data network, one or more memory devices connected to a data bus on a computing device that executes the video editor 102, or some combination thereof.

In one example, the video editor 102 accesses video content having one or more annotated target regions Ω. Examples of an annotated target region include a hole generated by one or more erasure inputs received via the input device 120, a particular target object to be replaced (e.g., the camel depicted in FIG. 2) that is identified by one or more selection inputs received via the input device 120 as a particular target object to be modified (e.g., modifying the appearance of a target object rather than removing it) that is identified by one or more selection inputs received via the input device 120, a dark area in the scene generated by dust on the lens of a camera used to capture the scene, or a shadow to be removed. The video editor 102 is used to modify some or all pixels in the hole with color values. For instance, if an object is to be removed or a hole to be filled, the video editor is used to modify target pixels in the target region to have color information that would have resulted from capturing the scene without the object.

At block 604, the process 600 involves computing a boundary motion for a boundary of a target region indicated by an annotation associated with the scene. The video editor 102 can compute an optical flow with respect to a set of video frames that collectively depict a scene. For instance, the video frames can be included in an input video I of height H, width W and number of frames L. The confidence engine 104 or another suitable engine of the video editor 102 computes a forward flow U and a backward flow V. To compute the motion between frame n and n+1, the confidence engine 104 or another suitable engine of the video editor 102 computes the flow (motion) from time n to time n+1. The forward flow at position (x, y, n) (i.e., a pixel at position (x, y) on a frame at time n) is given by U (x, y, n)=(dx, dy, +1), indicating a flow vector (dx, dy) from a point located at (x, y, n) to a point (x+dx, y+dy, n+1) in the video I. The backward flow at position (x, y, n) (i.e., a pixel at position (x, y) on frame n) is given by V (x, y, f)=(dx, dy, −1).

In this example, a boundary motion is a motion with respect to one or more pixels that define a boundary of a target region. The boundary can be, for example, the set of pixels that neighbor the union of the hole in a video frame n and a video frame n+1. This set of boundary pixels can include pixels having some commonality with one another that are adjacent to at least one other pixel not sharing the commonality (e.g., two pixels that share at least some color information and that have no common color information with respect to an adjacent pixel in the target region).

At block 606, the process 600 involves assigning confidence values to boundary pixels. For instance, as discussed below with respect to block 608, the video editor 102 performs one or more operations that estimate or otherwise determine what pixel motion would have occurred in the target region if the target region had the desired appearance (e.g., if a hole was filled, if a target object was removed, if a target object's appearance was modified, etc.). This step involves computing the confidence of motion at the boundary of the hole. The confidence values computed at block 606 control the role played by various boundary pixel motions to the interpolated target motion. In one example, the confidence engine 104 assigns a first confidence value to a first boundary pixel and assigns a second, higher confidence value to a second boundary pixel. Since the second confidence value is greater than the first confidence value, the motion of the second boundary pixel having the second confidence value will have a larger impact on the estimation of motion within the target region as compared to the motion of the first boundary pixel having the first confidence value.

The confidence values can be used to control how the observed motion of certain pixels associated with a given object outside a target region (e.g., boundary pixels) is used to estimate un-observed motion within the target region. For instance, a moving scene could depict a target object, which is to be removed, occluding another object, which the user does not wish to remove. The movement of the occluded object through the target region can be considered un-observed because, in the frames depicting the target object moving in front of the second object, the movement of the occluded object is not depicted. Since the motion of the occluded object is un-observed, the interpolation engine 106 performs an operation that estimates the motion of the occluded object by interpolating the motion at the boundary $B_1 = x_i, y_i)$ into the target region.

A naïve approach to this interpolation could apply equal weights to the boundary pixels so that every flow value inside the target region is determined by the entire set of equally boundary pixels. That is, the motion of some pixel inside the hole j∈Ω=($x_j$, $y_j$) could be determined as $$U(x_j, y_j, n) = f(U(B_1), \ldots, U(B_k)),$$

where k is the number of boundary pixels. But this naïve approach may give an undesirable weight to pixels whose motion at the boundary is unreliable. Unreliable motion could occur due to, for example, the motion of shadows cast in the scene, the motion of regions with little or no texture, etc. The confidence engine 104 can compute a confidence ($B_i$) for each of the boundary pixels $B_1 \ldots B_k$ that accounts for such unreliability.

In some aspects, the confidence engine 104 computes a combined confidence value confidence ($B_i$) for the ith boundary pixel ($B_i$) from a combination of a consistency component and a texture component. One example of a formula for the combined confidence value is confidence ($B_i$)=consistency(i)*texture(i). In other aspects, the confidence engine 104 computes a confidence value confidence ($B_i$) for the ith boundary pixel ($B_i$) from a consistency component without a texture component. Examples of a formula for such a confidence value are confidence($B_i$)=consistency(i) and confidence($B_i$)=g (consistency(i)), where g is some function that uses the consistency component as an input. In other aspects, the confidence engine 104 computes a confidence value confidence ($B_i$) for the ith boundary pixel ($B_i$) from a texture component without a consistency component. Examples of a formula for such a confidence value are confidence($B_i$)=texture(i) and confidence($B_i$)=g(texture(i)), where g is some function that uses the texture component as an input.

In some aspects, the confidence value is computed, at least in part, based on a consistency component. For a given pair of video frames from a set of video frames 112a-112n, the confidence engine 104 computes a forward optical flow and a backward optical flow of the particular boundary pixel with respect to the first video frame and the second video frame. An increase in the difference between the forward optical flow and the backward optical flow corresponds to a decrease in the particular confidence value. The confidence engine 104 applies a sigmoidal function to a difference between the forward optical flow and the backward optical flow.

In one example, the confidence engine 104 computes a consistency component from the agreement (or lack thereof) between the forward flow U at time n and backward flow V at time n+1. For instance, the confidence engine 104 computes the difference between the forward optical flow and the backward optical flow by computing a distance from an observed position of the pixel in the first video frame and an estimated position of pixel computed by (i) applying the forward optical flow from the first video frame to the second video frame and (ii) applying the backward optical flow from the second video frame to the first video frame. To do so, the confidence engine 104 can compute the forward flow $U(x_i, y_i, n) = (dx, dy, 1)$. The confidence engine 104 indexes this forward flow into the backward flow $V(x_i+dx, y_i+dx, n+1) = (\widehat{dx}, \widehat{dy}, -1)$. The confidence engine 108 can use this backward flow to compute a position in the frame at time n as $(\hat{x}_i, \hat{y}_i) = (x_i + dx + \widehat{dx}, y_i + dy + \widehat{dy})$. If the flow is perfectly consistent, then $dx = -\widehat{dx}$ and $dy = -\widehat{dy}$, i.e., the forward and backward flow are opposite. If the $dx \neq -\widehat{dx}$ and/or $dy \neq -\widehat{dy}$, then the flow is less reliable. To compute a consistency component of a confidence value, the confidence engine 104 can apply a sigmoidal function:

$$\epsilon_i = \sqrt{(dx+\widehat{dx})^2 + (dy+\widehat{dy})^2}$$

$$\text{consistency}(i) = e^{(-\epsilon_i^2/\sigma_c^2)}$$

In this example, the term $\epsilon_i$ is the distance (in pixels) between the starting pixel, and the round-trip location after following forward and backward flow, and $\sigma_c$ controls the shape of the energy function. In one example, $\sigma_c = 0.5$.

In some aspects, a particular confidence value for a boundary pixel includes the output of the sigmoidal function (e.g., if consistency alone is used to compute confidence). In additional or alternative aspects, a particular confidence value for a boundary pixel is derived from the output of the sigmoidal function (e.g., if a consistency component is combined with some other component to compute confidence). For instance, deriving the particular confidence value from the output of the sigmoidal function could include multiplying the output of the sigmoidal function by a texture-based confidence computed from the texture in a window region that includes a particular boundary pixel and certain surrounding pixels.

In additional or alternative aspects, the confidence value is computed, at least in part, based on a texture component. In one example, the confidence engine 104 determines the texture component based on a variance in the grayscale intensity values in a specified window region around each boundary pixel. An increase in the texture corresponds to an increase in the particular confidence value. For instance, if a block of pixels all has the same color, then there is no texture and no variance in appearance. A lack of texture or low amount of texture (i.e., little or no variance in grayscale intensity values) indicates that the flow is unreliable.

In one example, the variance of intensity values in the region comprises a summation of intensity differences, where each intensity difference is a difference between a grayscale intensity of a respective pixel in the region and an average grayscale intensity of the region. For instance, for a given window region having radius w, the confidence engine 104 can compute the variance of the intensity values around a given pixel boundary pixel i:

$$\text{variance}_i^2 = \frac{\sum_{u=-w}^{w} \sum_{v=-w}^{w} G((x_i+u, y_i+v, n)) - \mu}{2*w+1}$$

$$\text{texture}(i) = e^{\{\text{variance}_i^2 / \sigma_t^2\}}$$

In this example, μ is the average grayscale intensity in the window, G(x, y, n) is the grayscale intensity at position (x, y) and time n, and $\sigma_t$ controls the shape of the energy function. In one example, $\sigma_t = 0.125$ (grayscale values are between 0.0 and 1.0) and w=4, leading to an 9×9 pixel window.

The example provided above involves a forward texture component for computing confidence values, where the motion field for a given frame n is computed using confidence values that are generated, at least in part, by analyzing the texture in the frame n. In additional or alternative aspects, a backward texture component is used for computing confidence values. In these aspects, the confidence engine 104 can compute the backward texture component by using grayscale intensity values in frame n+1. Thus, the motion field for a given frame n is computed using confidence values that are generated, at least in part, by a backward texture component corresponding to the texture in the frame n+1.

In some aspects, one or more operations from block 606 are performed after block 604, as illustrated in FIG. 6. In additional or alternative aspects, the process 600 can be modified by performing one or more operations from block 606 in parallel with block 604 or prior to block 604. For instance, operations involving a texture analysis can be performed in parallel with or prior to computing a boundary motion.

At block 608, the process 600 involves interpolating, using the confidence values, a target motion of a target pixel within the target region from the boundary motion. For instance, the interpolation engine 106 generates a modified motion field for a specific video frame (i.e., estimates the motion of a pixel in the target region of a specific frame) as a function of (i) the motion of the boundary pixels at the boundary of the target region (ii) the confidence values assigned at block 606. For instance, the interpolation engine 106 computes the motion of a pixel using the following formula: $U(x_j, y_j, n) = f(U(B), confidence(B))$. In this formula, $U(B)$ is used as a shorthand for $U(B_1), U(B_2), \ldots, U(B_k)$, and confidence(B) is used as shorthand for confidence($B_1$), confidence($B_2$), ... confidence($B_k$).

In some aspects, the video editor 102 also computes the interpolated target motion using tracked 3D points. For instance, the video editor 102 can use structure from motion ("SfM") to track 3D points with known motion as they pass through the hole. Motion from 3D objects within the hole are ignored, and background objects are used. In some aspects, for points that have been tracked through the hole using SfM, the video editor 102 assigns full confidence to the corresponding pixels (e.g., k=1). In additional or alternative aspects, pixels corresponding to tracked 3D points may be assigned confidence values that are higher than the confidence values for boundary pixels, as information is inside the target region may be more reliable. This may be determined, for example, by the number of cameras (frames) in which that point was visible in the video volume.

Any suitable motion-interpolation process may be used. In some aspects, the interpolation engine 106 interpolates position differences (i.e., motion) along a boundary between corresponding pixels of a next video frame in a sequence (e.g., frame n+1) and a current video frame in the sequence (e.g., frame n). The position difference can be interpolated from the boundary throughout other portions of the target region (e.g., a hole), such as from the boundary to the inner portion of the target region. In other words, the position differences (i.e., motion) determined for pixels along the boundary are used to propagate position changes (i.e., motion) through the target region (e.g., inward).

For instance, the interpolation engine 106 recursively down samples or collapses the target region by a sampling factor (e.g., 2) to produce a plurality of down sampled portions. Initially, the set of motion data associated with the pixels of the target region can be designated as motion data associated with level 0. As described, the set of motion data for a pixel may include position difference (i.e. motion) components and a direction indicator. For instance, an example set of initial motion data for a pixel position may be {dx, dy, 1} or {dx, dy, −1}, where dx represents a difference in the x coordinate value, dy represents a difference in the y coordinate value, 1 represents forward flow, and 0 represents the absence of motion. The function for the original or level 0 target region with position difference (i.e. motion) components and a direction indicator can be described as follows:

pyramid_level[0]= if(on_border)c×($x_{n+1}-x_n, y_{n+1}-y_n, 1$)

else(0,0,0)

In this example, the position differences are computed based on the boundary pixel position in the next video frame color minus the boundary pixel position in the current video frame (e.g., $x_{n+1}-x_n$, $y_{n+1}-y_n$).

The original target region, as represented by position difference (i.e. motion) components and a direction indicator, can be down sampled by a factor, such as two, to produce a first down sampled image that is a portion (e.g., half) of the resolution of the original target region. As can be appreciated, in down sampling, direction indicators are generated for pixels of the first down sampled image. By way of example only, assume that a set of four pixels is being reduced to one pixel. Further assume that three of the four pixels do not correspond with a boundary and, as such, include a zero-value direction indicator and that one of the four pixels does correspond with a boundary and, as such, includes a one-value direction indicator. In such a case, the direction indicators are aggregated or averaged to derive a direction indicator of 0.25 for the pixel in the down sampled image. The computed direction indicator of 0.25 indicates the number of pixels with position difference (i.e., motion) information that were used to compute the value (e.g., 25% of pixels used to compute results include some position difference (i.e., motion) information).

In accordance with generating each of the new direction indicators for the various pixel positions of the first down sampled image, the greatest or largest direction indicator value can be identified. In this manner, the value associated with the largest amount of position difference (i.e., motion) information available on the particular down sampled level (e.g., the first down sampled image) is identified. For each pixel of the first down sampled image, the position difference (i.e., motion) values (e.g., x and y coordinate values) and the direction indicators can then be divided by the greatest direction indicator value. Such a process renormalizes the data in accordance with the maximum indication of position difference (i.e., motion) information.

At block 610, the process 600 involves updating color data of the target pixel to correspond to the target motion interpolated from the boundary motion. For instance, the video editor 102 uses motion fields that have been modified with interpolated target motion of various pixels to trace paths of the pixels from location within the target region to one or more locations outside the target region. For each pixel inside the target region in a given video frame, the video editor 102 copies the pixel data (e.g., color information) from a corresponding pixel that has been traced to another video frame, as described above with respect to FIG. 5.

Updating color data can include any process in which video content, after being edited using the process 600, displays one or more modifications to the target region after playback. In some aspects, updating color data involves modifying an image layer that includes the target object in one or more video frames. In additional or alternative aspects, updating color data involves overlaying one or more image layers with the modified target region and one or more image layers that include the unmodified target object in one or more video frames. In one example, the video editor 102 could create a set of video frames having a mask in the shape of the target region, where pixels outside the target region are set to be transparent and pixels within the target region are set to be opaque. The video editor 102 can update the opaque pixels of this image layer at block 610. The video editor can create a multi-layered set of frames in which the layer having opaque pixels depicting the modified target region and transparent pixels elsewhere is overlaid on a source layer that includes the video content with the unmodified target region. Any number of layers, with different configurations of masks, can be used to generate an output video having the modified target region.

Example of a Computing System for Implementing Certain Aspects

Figure 7:
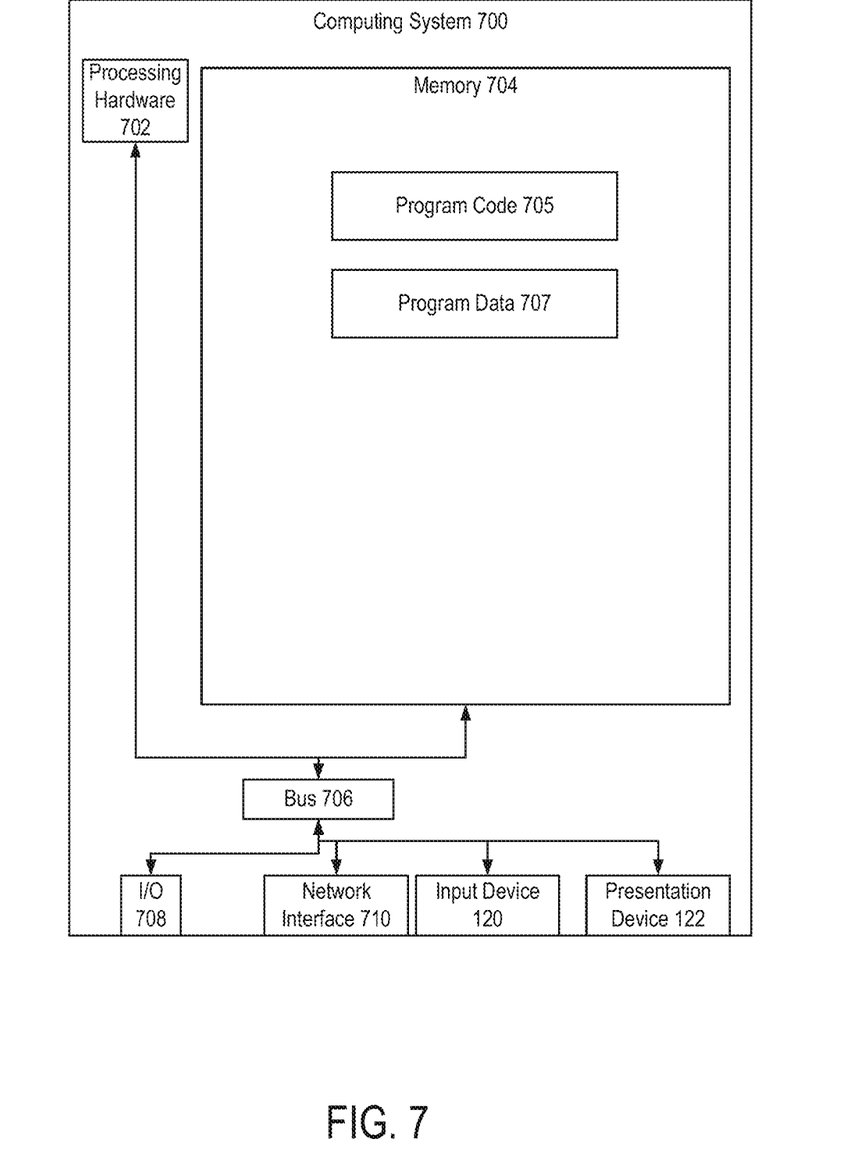
FIG. 7 depicts an example of a computing system for implementing one or more aspects of this disclosure.

Any suitable computing system or group of computing systems can be used for performing the operations described herein. For example, FIG. 7 depicts an example of a computing system 700. In some aspects, the computing system 700 includes processing hardware 702 that executes program code 705 (e.g., the video editor 102, the confidence engine 104, the interpolation engine 106, the color update engine 108), a memory device 704 that stores one or more sets of program data 707 computed or used by operations in the program code 705 (e.g., a set of input video frames, annotations identifying target regions, motion fields, a set of edited video frames, etc.), one or more input devices 120, and one or more presentation devices 122 for displaying graphical content generated by executing the program code 705. For illustrative purposes, FIG. 7 depicts a single computing system on which the program code 705 is executed, the program data 707 is stored, and the input devices 120 and presentation device 714 are present. But various applications, datasets, and devices described can be stored or included across different computing systems having devices similar to the devices depicted in FIG. 7.

The depicted example of a computing system 700 includes processing hardware 702 communicatively coupled to one or more memory devices 704. The processing hardware 702 executes computer-executable program code stored in a memory device 704, accesses information stored in the memory device 704, or both. Examples of the processing hardware 702 include a microprocessor, an application-specific integrated circuit ("ASIC"), a field-programmable gate array ("FPGA"), or any other suitable processing device. The processing hardware 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code 705. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 705 may include processor-specific instructions generated by a compiler or an interpreter from code written in any suitable computer-programming language, including, for example, C, C++, C #, Visual Basic, Java, Python, Perl, JavaScript, and ActionScript.

The computing system 700 may also include a number of external or internal devices, such as an input device 120, a presentation device 714, or other input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code 705 that configures the processing hardware 702 to perform one or more of the operations described herein. The program code 705 includes, for example, the video editor 102, the confidence engine 104, the interpolation engine 106, the color update engine 108, or other suitable program code that performs one or more operations described herein. The program code 705 may be resident in the memory device 704 or any suitable computer-readable medium and may be executed by the processing hardware 702 or any other suitable processor. The program code 705 uses or generates program data 707. Examples of the program data 707 include one or more of the memory frames, ground truth frames, feature-classification data, feature-selection data, key or value maps, etc. described herein with respect to FIGS. 1-7.

In some aspects, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices via a data network using the network interface device 710.

An input device 120 can include any device or group of devices suitable for receiving visual, auditory, or other suitable input that controls or affects the operations of the processing hardware 702. Non-limiting examples of the input device 120 include a recording device, a touchscreen, a mouse, a keyboard, a microphone, a video camera, a separate mobile computing device, etc. A presentation device 714 can include any device or group of devices suitable for providing visual, auditory, or other suitable sensory output. Non-limiting examples of the presentation device 714 include a touchscreen, a monitor, a separate mobile computing device, etc.

Although FIG. 7 depicts the input device 120 and the presentation device 714 as being local to the computing device that executes the program code 705, other implementations are possible. For instance, in some aspects, one or more of the input device 120 and the presentation device 714 can include a remote client-computing device that communicates with the computing system 700 via the network interface device 710 using one or more data networks described herein.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

The invention claimed is:

1. A method in which one or more processing devices performs operations comprising:
    accessing a scene comprising a first video frame and a second video frame, the accessed scene having an annotation identifying a target region to be modified in one or more video frames comprising the scene;
    computing a boundary motion for a boundary of the target region within the scene, wherein the boundary includes boundary pixels neighboring the target region in the first video frame and the second video frame;
    assigning confidence values to the boundary pixels, respectively, wherein assigning a particular confidence value comprises:
        computing a forward optical flow and a backward optical flow of a particular boundary pixel with respect to the first video frame and the second video frame; and
        applying a sigmoidal function to a difference between the forward optical flow and the backward optical flow, wherein the particular confidence value includes or is derived from an output of the sigmoidal function,
            wherein an increase in the difference between the forward optical flow and the backward optical flow corresponds to a decrease in the particular confidence value;
    interpolating a target motion of a target pixel within the target region from the boundary motion, wherein the particular confidence value of the particular boundary pixel controls a contribution of a particular motion of the particular boundary pixel to the target motion as interpolated from the boundary motion; and
    updating color data of the target pixel to correspond to the target motion interpolated from the boundary motion.

2. The method of claim 1, the operations further comprising computing the difference between the forward optical flow and the backward optical flow by performing additional operations comprising:
    identifying an observed position of the particular boundary pixel in the first video frame;
    computing an estimated position of the particular boundary pixel by (i) applying the forward optical flow from the first video frame to the second video frame and (ii) applying the backward optical flow from the second video frame to the first video frame; and
    computing a distance from the observed position to the estimated position.

3. The method of claim 1, wherein the operations further comprise deriving the particular confidence value from the output of the sigmoidal function,
    wherein deriving the particular confidence value from the output of the sigmoidal function comprises multiplying the output of the sigmoidal function by a texture component that is computed from the texture in a window region that includes the particular boundary pixel and a set of pixels in a window around the particular boundary pixel,
    wherein an increase in the texture corresponds to an increase in the particular confidence value.

4. The method of claim 3, the operations further comprising computing the texture component by computing, in the first video frame or the second video frame, a variance of intensity values in the window region.

5. The method of claim 4, wherein the variance of intensity values in the window region comprises a summation of intensity differences, wherein each intensity difference is a difference between a grayscale intensity of a respective pixel in the window region and an average grayscale intensity of the window region.

6. The method of claim 1, the operations further comprising assigning the particular confidence value by performing additional operations that comprise computing, in the first video frame or the second video frame, a variance of intensity values in a window region that includes the particular boundary pixel and a set of pixels in a window around the particular boundary pixel,
    wherein a decrease in the variance of intensity values corresponds to a decrease in the particular confidence value.

7. The method of claim 6, wherein the variance of intensity values in the window region comprises a summation of intensity differences, wherein each intensity difference is a difference between a grayscale intensity of a respective pixel in the window region and an average grayscale intensity of the window region.

8. The method of claim 1, wherein the target region comprises an object to be removed or modified.

9. A non-transitory computer-readable medium having program code stored thereon that, when executed by one or more processing devices, causes the one or more processing devices to perform operations comprising:
   accessing a video having a target region;
   a step for updating video content in the target region based on a confidence-weighted motion estimation for the target region, wherein the step for updating video content comprises:
      computing a forward optical flow and a backward optical flow of a particular boundary pixel of the target region and with respect to a first video frame and a second video frame; and
      applying a sigmoidal function to a difference between the forward optical flow and the backward optical flow, wherein a particular confidence value includes or is derived from an output of the sigmoidal function,
      wherein an increase in the difference between the forward optical flow and the backward optical flow corresponds to a decrease in the particular confidence value; and
   presenting the updated video content on a display device.

10. The non-transitory computer-readable medium of claim 9, wherein the step for updating video content in the target region based on the confidence-weighted motion estimation for the target region comprises:
   computing, in one or more video frames of the video content that depict the target region, a variance of intensity values in a window region that includes (i) a particular boundary pixel from a boundary around the target region and (ii) a set of pixels in a window around the particular boundary pixel, wherein a decrease in the variance of intensity values corresponds to a decrease in a particular confidence value of the particular boundary pixel.

11. The non-transitory computer-readable medium of claim 9, the operations further comprising computing the difference between the forward optical flow and the backward optical flow by performing additional operations comprising:
   identifying an observed position of the particular boundary pixel in the first video frame;
   computing an estimated position of the particular boundary pixel by (i) applying the forward optical flow from the first video frame to the second video frame and (ii) applying the backward optical flow from the second video frame to the first video frame; and
   computing a distance from the observed position to the estimated position.

12. The non-transitory computer-readable medium of claim 9, wherein the operations further comprise deriving the particular confidence value from the output of the sigmoidal function,
   wherein deriving the particular confidence value from the output of the sigmoidal function comprises multiplying the output of the sigmoidal function by a texture component that is computed from the texture in a window region that includes the particular boundary pixel and a set of pixels in a window around the particular boundary pixel,
   wherein an increase in the texture corresponds to an increase in the particular confidence value.

13. The non-transitory computer-readable medium of claim 9, the operations further comprising assigning the particular confidence value by performing additional operations that comprise computing, in the first video frame or the second video frame, a variance of intensity values in a window region that includes the particular boundary pixel and a set of pixels in a window around the particular boundary pixel, wherein a decrease in the variance of intensity values corresponds to a decrease in the particular confidence value.

14. A system comprising:
   a processing device; and
   a non-transitory computer-readable medium communicatively coupled to the processing device,
   wherein the processing device is configured to execute program code stored on the non-transitory computer-readable medium and thereby perform operations comprising:
      accessing a scene comprising a first video frame and a second video frame, the accessed scene having an annotation identifying a target region to be modified in one or more video frames comprising the scene,
      computing a boundary motion for a boundary of the target region within the scene, wherein the boundary includes boundary pixels neighboring the target region in the first video frame and the second video frame,
      assigning confidence values to the boundary pixels, respectively, wherein assigning a particular confidence value comprises:
         computing a forward optical flow and a backward optical flow of a particular boundary pixel with respect to the first video frame and the second video frame; and
         applying a sigmoidal function to a difference between the forward optical flow and the backward optical flow, wherein the particular confidence value includes or is derived from an output of the sigmoidal function, and
         wherein an increase in the difference between the forward optical flow and the backward optical flow corresponds to a decrease in the particular confidence value,
      interpolating a target motion of a target pixel within the target region from the boundary motion, wherein the particular confidence value of the particular boundary pixel controls a contribution of a particular motion of the particular boundary pixel to the target motion as interpolated from the boundary motion, and
      updating color data of the target pixel to correspond to the target motion interpolated from the boundary motion.

15. The system of claim 14, the operations further comprising computing the difference between the forward optical flow and the backward optical flow by performing additional operations comprising:
   identifying an observed position of the particular boundary pixel in the first video frame;
   computing an estimated position of the particular boundary pixel by (i) applying the forward optical flow from the first video frame to the second video frame and (ii) applying the backward optical flow from the second video frame to the first video frame; and
   computing a distance from the observed position to the estimated position.

16. The system of claim 14, wherein the operations further comprise deriving the particular confidence value from the output of the sigmoidal function,
  wherein deriving the particular confidence value from the output of the sigmoidal function comprises multiplying the output of the sigmoidal function by a texture component that is computed from the texture in a window region that includes the particular boundary pixel and a set of pixels in a window around the particular boundary pixel,
  wherein an increase in the texture corresponds to an increase in the particular confidence value.

17. The system of claim 16, the operations further comprising computing the texture component by computing, in the first video frame or the second video frame, a variance of intensity values in the window region.

18. The system of claim 17, wherein the variance of intensity values in the window region comprises a summation of intensity differences, wherein each intensity difference is a difference between a grayscale intensity of a respective pixel in the window region and an average grayscale intensity of the window region.

19. The system of claim 14, the operations further comprising assigning the particular confidence value by performing additional operations that comprise computing, in the first video frame or the second video frame, a variance of intensity values in a window region that includes the particular boundary pixel and a set of pixels in a window around the particular boundary pixel, wherein a decrease in the variance of intensity values corresponds to a decrease in the particular confidence value.

20. The system of claim 19, wherein the variance of intensity values in the window region comprises a summation of intensity differences, wherein each intensity difference is a difference between a grayscale intensity of a respective pixel in the window region and an average grayscale intensity of the window region.

\* \* \* \* \*